United States Patent
Foster et al.

(10) Patent No.: US 12,359,109 B2
(45) Date of Patent: Jul. 15, 2025

(54) SURFACTANT PACKAGE FOR DIRECT EMULSION DRILLING FLUID

(71) Applicant: Schlumberger Technology Corporation, Sugar Land, TX (US)

(72) Inventors: Lynn Michelle Foster, Pearland, TX (US); Jeremy Smith, Houston, TX (US); Dimitri M. Khramov, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/811,251

(22) Filed: Jul. 7, 2022

(65) Prior Publication Data

US 2023/0011243 A1 Jan. 12, 2023

Related U.S. Application Data

(60) Provisional application No. 63/203,073, filed on Jul. 7, 2021.

(51) Int. Cl.
*C09K 8/28* (2006.01)
*E21B 21/00* (2006.01)

(52) U.S. Cl.
CPC ............... *C09K 8/28* (2013.01); *E21B 21/00* (2013.01)

(58) Field of Classification Search
CPC .......... C09K 8/28; C09K 23/42; C09K 8/035; E21B 21/00
See application file for complete search history.

(56) References Cited

U.S. PATENT DOCUMENTS

| | | | | |
|---|---|---|---|---|
| 4,780,220 A | * | 10/1988 | Peterson | ............... C09K 8/22 507/261 |
| 2005/0137114 A1 | * | 6/2005 | Gatlin | ............... C09K 8/703 510/424 |
| 2013/0118531 A1 | * | 5/2013 | Dobrawa | ............ C11D 3/3765 510/417 |
| 2014/0024560 A1 | | 1/2014 | Gonzalez Poche et al. | |
| 2017/0029687 A1 | | 2/2017 | Brunner et al. | |
| 2017/0362489 A1 | | 12/2017 | Jackson et al. | |
| 2018/0298706 A1 | | 10/2018 | Rodriguez | |
| 2019/0211255 A1 | * | 7/2019 | Tellakula | ............... C09K 8/604 |

FOREIGN PATENT DOCUMENTS

| | | | |
|---|---|---|---|
| CN | 103897676 A | | 7/2014 |
| CN | 107011876 A | * | 8/2017 ............... C09K 8/03 |

OTHER PUBLICATIONS

Product Data Sheet (downloaded on Mar. 29, 2024).*
International Search Report and Written Opinion issued in International Patent application PCT/US2022/036373 dated Nov. 3, 2022, 10 pages.

* cited by examiner

*Primary Examiner* — Kumar R Bhushan
(74) *Attorney, Agent, or Firm* — Jeffrey D. Frantz

(57) ABSTRACT

Drilling fluid mixtures are described herein that are stable oil-in-water emulsions. Also described herein are surfactant packages for stabilizing such emulsions. The surfactant packages use an alkyl ether anion comprising an alkyl portion, an anionic head group, and an ether portion between the alkyl portion and the anionic head group.

9 Claims, 4 Drawing Sheets

SURFACTANT PACKAGE FOR DIRECT EMULSION DRILLING FLUID

CROSS-REFERENCE TO RELATED APPLICATION

The present application claims the benefit of, and priority to, U.S. Provisional Patent Application No. 63/203,073, filed Jul. 7, 2021, which is hereby incorporated by reference in its entirety.

FIELD

This application relates to stable emulsions used as drilling fluids. More specifically, this application relates to methods and compositions for stabilizing oil-in-water emulsions for use in drilling geologic formations having salt components in both the vertical and lateral sections of an oil or gas containing subterranean formation.

BACKGROUND

Direct emulsion, oil-in-water, drilling fluids are used when drilling through salt formations; but can also be used for the entire length of the well from the surface through the vertical sections to the lateral sections. The external phase of a direct emulsion is an aqueous phase, which can be pure water or an aqueous salt solution of various concentrations. A direct emulsion with an aqueous salt solution as the external phase has decreased density compared to pure salt brine. Saturated salt brine, such as NaCl, is used when drilling through salt formations because saturated brine does not dissolve salt from the formation, reducing or eliminating formation damage when the formation contains a lot of salt. While using an inverted emulsion (water-in-oil) can decrease density of the drilling fluid further, invert emulsion systems are less tolerant to formations where large water influxes are expected.

Because of high salinity and presence of polyvalent cations, many surfactants that form direct oil-in-water emulsions are not suitable for use with salt containing formations. Dodecylbenzene sulfonate (typical dishwashing soap) and various fatty acids, for example, can undergo undesirable phase inversion in high salinity and variable temperature environments. Direct emulsion-based drilling fluids are expected to remain water continuous from temperatures at or below the freezing temperature of water up to about 150-200° F. (expected downhole temperature), and are expected to be able to function despite large influxes of water or salt water.

Conventional direct emulsion drilling fluids are stabilized with a combination of surfactants and polymers. FIG. 1A is a color photograph of an unstable mixture comprising an oil phase and an aqueous salt-containing phase. A container 100 has a liquid volume 102 therein that has separated into a first phase 104, which is the aqueous phase, and a second phase 106, which is the oil phase. FIG. 1B is a color photograph of a stable emulsion with components similar to the mixture of FIG. 1A. The container 100 has a liquid volume 110 that is a single phase with no phase separation evident.

The polymers conventionally used to stabilize such emulsions can cause viscosity increase upon exposure to lime, and viscosity of the aqueous continuous phase can cause foam formation via air entrapment. The entrapped air can also cause corrosion in some equipment. Existing surfactants alone are insufficient to stabilize direct emulsion systems, so the polymer is considered a necessary component of conventional systems. Reducing the concentration of polymer in the system, to control viscosity rise and entrapped air, has a detrimental effect on emulsion stability. There is a need for surfactant systems that can stabilize direct emulsion drilling fluids for use in high salinity environments over a wide range of temperatures without causing viscosity increase and foaming.

SUMMARY

Embodiments described herein provide a drilling fluid comprising an emulsion of an aqueous phase, either pure water or aqueous salt solution of various salt composition and concentration, and an oil, the emulsion stabilized using an alkyl ether anion surfactant package.

Other embodiments herein provide a surfactant package for stabilizing an oil-in-water emulsion, the surfactant package comprising an alkyl ether anion having the general formula

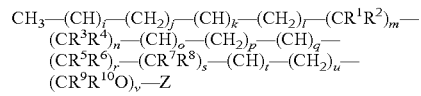

wherein i, j, k, l, m, n, o, p, q, r, s, t, u, and v are integers, i+j+k+l+m+n+o+p+q+r+s+t+u+v is 4 to 30, m+n+r+s is 0 to 2, i+k+o+q+t is 0 to 2, v is 5 to 30, and $R^1$, $R^2$, $R^5$, and $R^6$ are each, independently, in each instance thereof, hydrogen, hydrocarbyl having 1 to 10 carbon atoms, alcohol-containing groups, or ether or polyether groups, $R^3$, $R^4$, $R^7$, and $R^8$ are each, independently, in each instance thereof, hydrocarbenyl groups having 1 to 10 carbon atoms and, at most, one carbon-carbon double bond each, $R^9$ and $R^{10}$ are each, independently, in each instance thereof, hydrogen, methyl groups, or ethyl groups, and Z is an anionic head group.

Other embodiments described herein provide a method, comprising obtaining a drilling fluid comprising an emulsion of an oil dispersed within an aqueous phase, the emulsion stabilized using an alkyl ether anion surfactant package; and drilling a well into a geologic formation with salt-containing components using the drilling fluid.

DETAILED DESCRIPTION

Figure 1A:
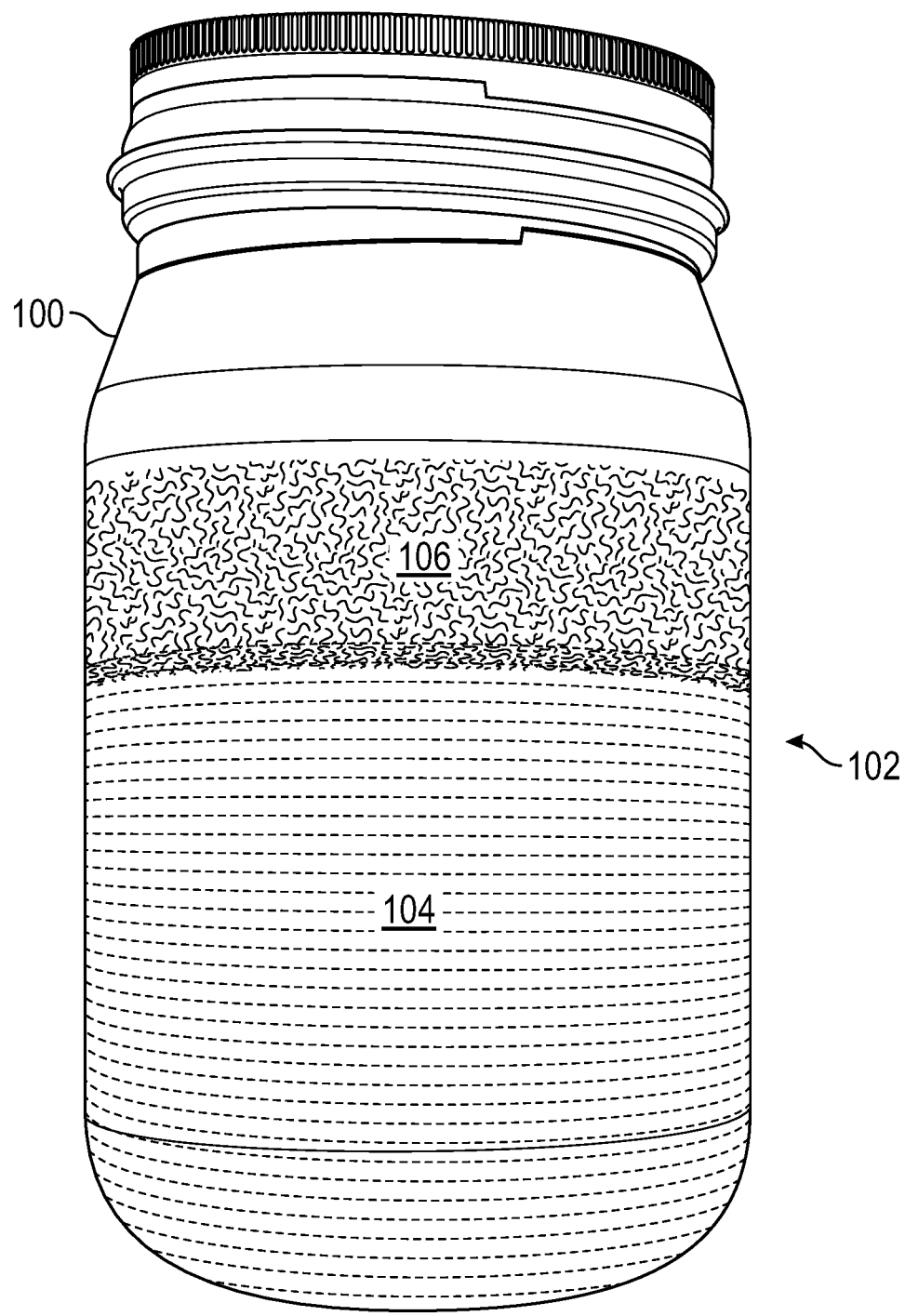
FIG. 1A is a color photograph of an unstable mixture comprising an oil phase and an aqueous salt-containing phase.
Figure 1B:
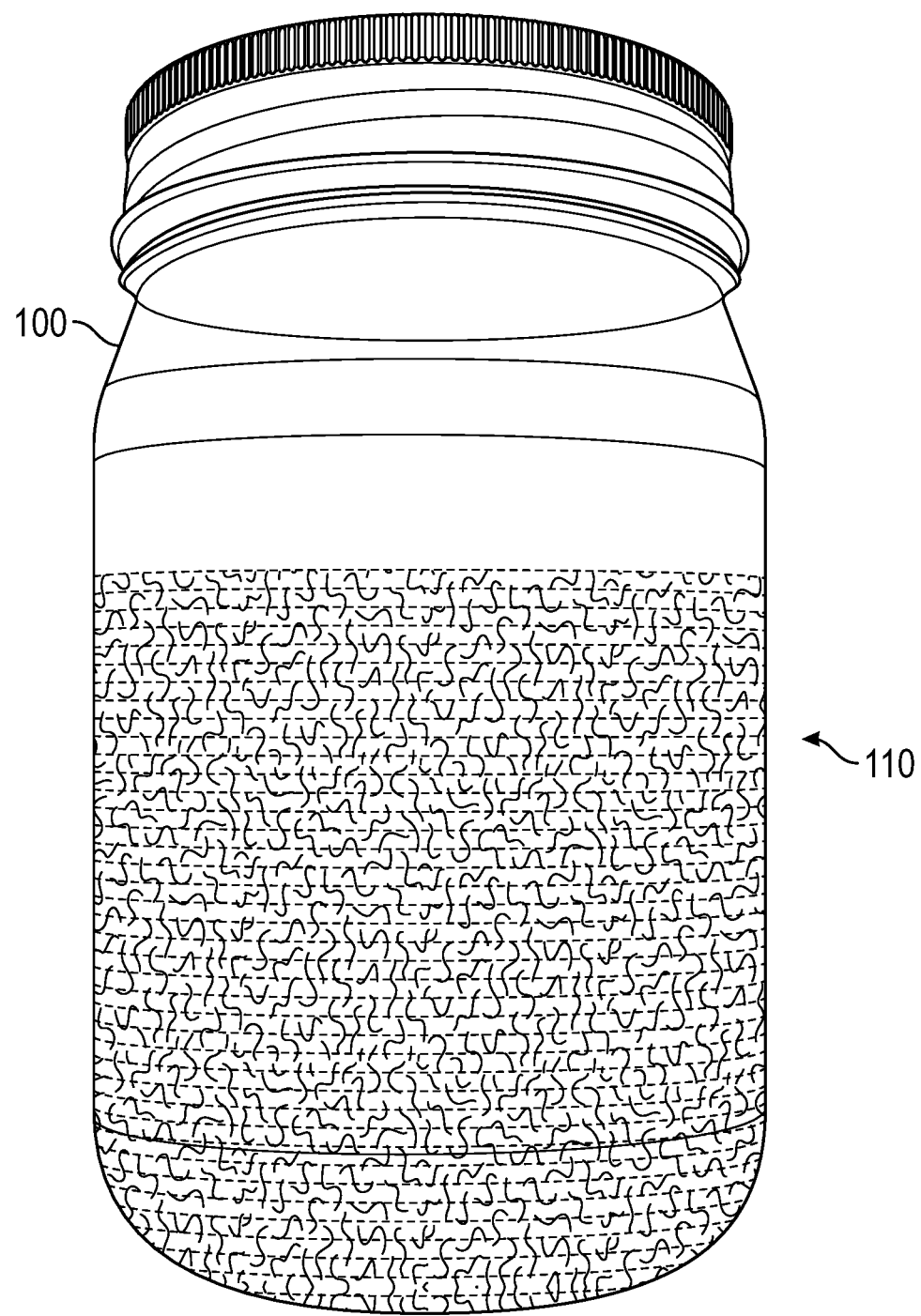
FIG. 1B is a color photograph of a stable emulsion with components similar to the mixture of FIG. 1A.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Described herein are additive systems for stabilizing saline direct emulsion drilling fluids without using polymers that can cause undesirable foaming. Saline direct emulsion drilling fluids stabilized using the systems described herein remain direct emulsions, with a continuous aqueous phase, in high salinity environments with water exposures, at temperatures from near the freezing point of saturated saline solution to as high as 200° F. These additive systems rely on alkyl ether carboxylate, sulfonate, or phosphate anions to stabilize the oil-water interface. The anions can be obtained by adding acids to the saline aqueous phase along with a basic neutralizing reagent or material such as NaOH, triethyl amine, or soda ash (a source of NaOH). For example, alkyl ether carboxylic acids, alkyl ether sulfonic acids, and alkyl ether phosphoric acids can be added to a saturated NaCl solution to generate alkyl ether anions, with sodium hydroxide to control pH.

The alkyl ether anions have an alkyl end portion, which may include functional groups, an ether middle portion, which may include functional groups, and an anionic head group, where the ether middle portion is between the anionic head group and the alkyl end portion. The alkyl portion of the alkyl ether anions provides micellar affinity to the oil phase to maintain the oil-in-water emulsion. Longer and/or larger alkyl end portions increase the micellar affinity to the oil phase, reducing tendency of the mixture to foam.

The ether portion of the alkyl ether anions provides water hardness stability. Conventional surfactants used for drilling fluids are sensitive to presence of divalent cation species, which can be encountered while applying a drilling fluid to a salt containing formation. The divalent species can cause unwanted reactions of conventional surfactants. The ether portion of the alkyl ether anions described herein reduce or prevent inversion when the drilling fluid encounters divalent species.

The alkyl ether carboxylate, sulfonate, or phosphonate anions used herein can be tuned. In one aspect, the length of the ether chain, and type of repeating units in the ether chain, can be selected to deliver desired properties. For example, the polymerization reaction of an alkylene oxide with an acid-terminating species, such as amide, can be performed with a targeted excess of alkylene oxide to yield an alkyl polyether anion species with a desired polyether chain length. Also, the polyether reaction can be performed using a mixture of alkylene oxides or with sequentially added aliquots of different alkylene oxides to yield random or block alkyl polyether chains terminated with carboxylate, sulfonate, or phosphonate functionality.

In another aspect, the polyether chain can be functionalized by making the alkyl polyether anions using functionalized alkylene oxides. Functionalities that can be added to the alkylene oxide portions of the alkyl polyether anions include methyl groups, ethyl groups, propyl groups, ethers, alcohols, carboxylic acids, sulfonates, and phosphates.

The alkyl polyether anions usable as surfactants to stabilize oil-in-water emulsions with saline or highly saline, for example saturated saline, solutions have the general structure, as follows:

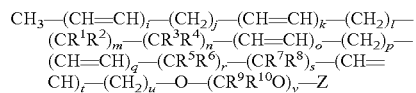

wherein i, j, k, l, m, n, o, p, q, r, s, t, u, and v are integers, j+l+m+n+p+t+s+u is 4 to 26, m+n+r+s is 0 to 2, i+k+o+q+t is 0 to 2, v is 5 to 30, and $R^1$, $R^2$, $R^5$, and $R^6$ are each, independently, in each instance thereof, hydrogen, hydrocarbyl having 1 to 10 carbon atoms, alcohol-containing groups, or ether or polyether groups, $R^3$, $R^4$, $R^7$, and $R^8$ are each, independently, in each instance thereof, hydrocarbenyl groups having 1 to 10 carbon atoms and, at most, one carbon-carbon double bond each, $R^9$ and $R^{10}$ are each, independently, in each instance thereof, hydrogen, methyl groups, or ethyl groups, and Z is an anionic head group such as carboxylate, sulfonate, or phosphate. In many cases, $R^9$ and $R^{10}$ are either both hydrogen in each instance, both methyl groups in each instance, or a mixture of hydrogen and methyl groups in any desired proportion and/or pattern. In one example, the surfactant is an oleyl (j=19; i=k=l=m=n=o=p=q=r=s=t=u=0) ether carboxylate (Z=carboxylate) having 9 to 14 ethylene oxide units ($R^9$=$R^{10}$=H; v=9 to 14), for example oleyl ether-9 carboxylate (j=19; i=k=l=m=n=o=p=q=r=s=t=u=0; v=9; $R^9$=$R^{10}$=H; Z=carboxylate). In another example, the alkyl ether carboxylate is a long-chain alkyl ether carboxylate, such as oleth-9-carboxylate (i=0; j=7; k=1; l=7; m=n=o=p=q=r=s=t=u=0; v=9; $R^9$=$R^{10}$=H; Z=carboxylate), oleth-10 carboxylate (i=0; j=7; k=1; l=7; m=n=o=p=q=r=s=t=u=0; v=10; $R^9$=$R^{10}$=H; Z=carboxylate), or oleth-11-carboxylate (i=0; j=7; k=1; l=7; m=n=o=p=q=r=s=t=u=0; v=11; $R^9$=$R^{10}$=H; Z=carboxylate). Oleyl or oleth phosphates and sulfonates can be used, with ether content numbers from 2 to 30. Lauryl, laureth, capryl, capryleth, stearyl, steareth, palmityl, palmiteth, and other long chain moieties can also be used, alone or in combination, with ether content numbers from 2 to 30. Example categories include oleth-α carboxylate, phosphate, or sulfonate, where a is 2 to 30; laureth-α carboxylate, phosphate, or sulfonate, where a is 2 to 30; capryleth-α carboxylate, phosphate, or sulfonate, where a is 2 to 30; steareth-α carboxylate, phosphate, or sulfonate, where a is 2 to 30; and palmiteth-α carboxylate, phosphate, or sulfonate, where a is 2 to 30.

As indicated by the formula above, the alkyl portion of the alkyl ether anion can be linear or branched, and can include unsaturation in carbon-carbon bonds in the main alkyl chain, to the extent there is a main alkyl chain, or in branches from the main alkyl chain. The alkyl portion can be linear, or can have up to two branches, which may branch from the same carbon atom or from different carbon atoms. The alkyl portion can be entirely saturated hydrocarbyl units, or can include up to two carbon-carbon double bonds, which can be anywhere in the main alkyl chain or in a branch. Two carbon-carbon double bonds can include the same carbon atom (i.e. a CH=C=CH structure), or two carbon-carbon double bonds can be between two different neighboring pairs of carbon atoms. The alkyl portion can also include only one carbon-carbon double bond. The alkyl portion can also include functional groups along the main chain, or any branches, and the functional groups can include alcohol-containing groups or ether or polyether groups. In general, the alkyl portion is a mainly linear hydrocarbyl structure, with up to two branches and up to two carbon-carbon double bonds, which can have pendant hydroxyl groups and/or oxygen incorporated as an ether structure at any location in the alkyl portion. This structure of the alkyl portion provides an oil-compatible structure that will intimately interact with oil molecules without forming self-aligning domains that reduce affinity of the alkyl portion with oil molecules. In this way, surfactant performance of the surfactant molecules in an emulsion of oil with an aqueous phase having substantial salt content is maintained.

The drilling fluid emulsified mixtures described herein typically have 70-80% saturated NaCl brine, 20-30% oil, such as diesel oil, base oil, or other oils suitable for use in drilling fluid emulsions and commonly used for such applications, and 5-10% one or more of the surfactants described above. The brine can also be unsaturated, and can contain other alkali metal salts, such as lithium and potassium salts, for example LiCl and KCl. Anions in the brine can also include other halogens, other inorganic anions such as sulfate, phosphate, and nitrate, and small organic anions such as acetate and citrate. A basic material such as NaOH, LiOH, or KOH, or an amine base, is added to control pH. The amount of surfactant used can control behaviors of the emulsified drilling fluid. For example, a moderately stable drilling emulsion can be generated using a low amount of surfactant such that the emulsion partially, but not completely, separates. The mixture retains enough emulsion character to function as a drilling fluid, but will partially separate over time to allow the oil fraction of the drilling fluid to be recovered after the drilling fluid is recovered to the surface.

The alkaline agents used in the drilling fluids described herein are generally strong bases capable of maintaining the surfactant species herein in anionic form to stabilize the phase interface of the emulsion. The alkaline agent can be classified as a hard base, Lewis base, or any other alkaline molecule that ionizes in water and deprotonates an acidic oxygen-based moiety or molecular group. Using soft bases promotes maintaining the surfactant species in anion form. Hydroxide bases and amine bases can generally be used. Lime, or calcium hydroxide, can be used as a base. Suitable amine bases generally do not contain aromatic components but may contain unsaturation or carbon-carbon double bonds and conjugation.

Figure 2A:
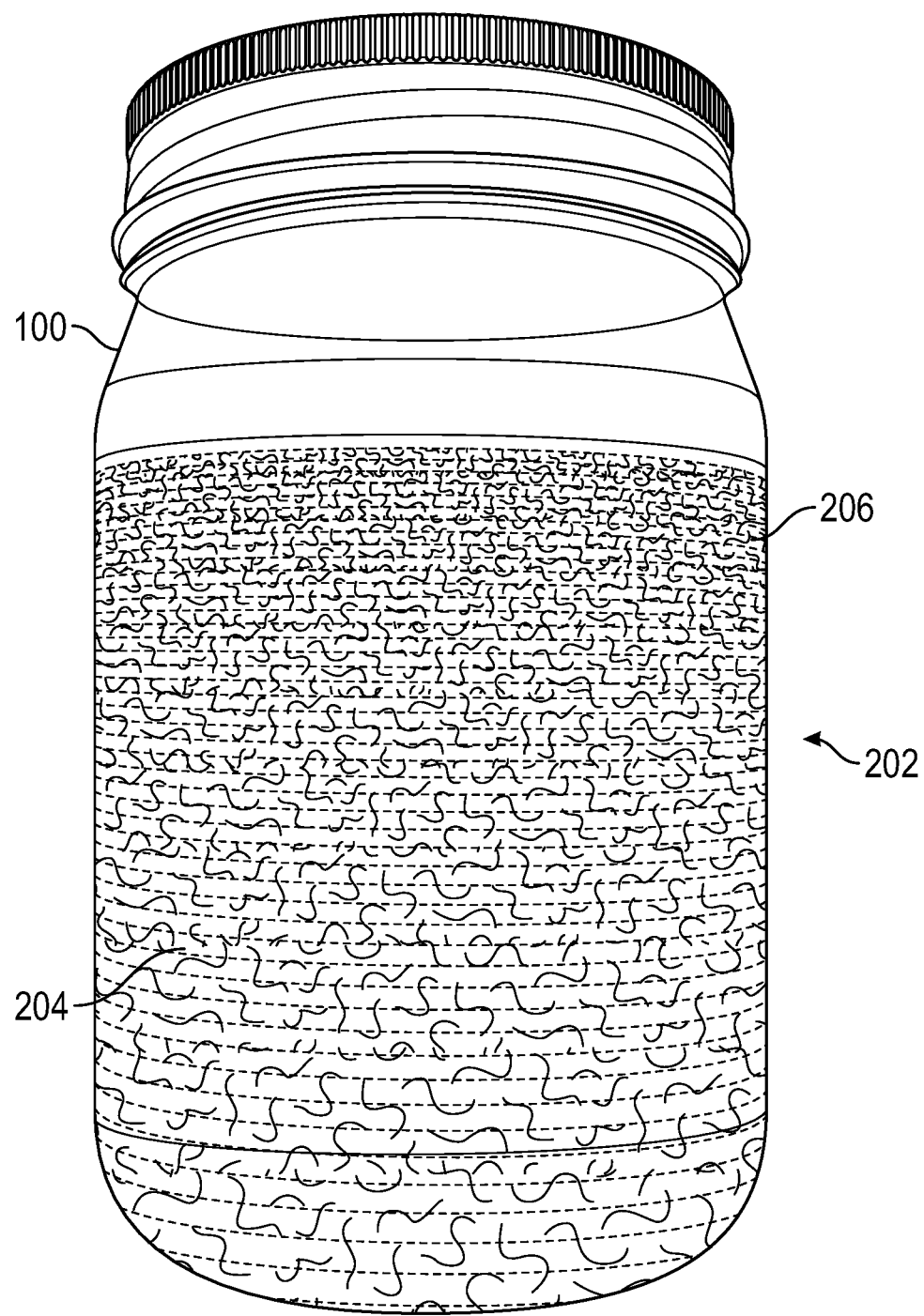
FIG. 2A is a color photograph of a partially stable emulsion.
Figure 2B:
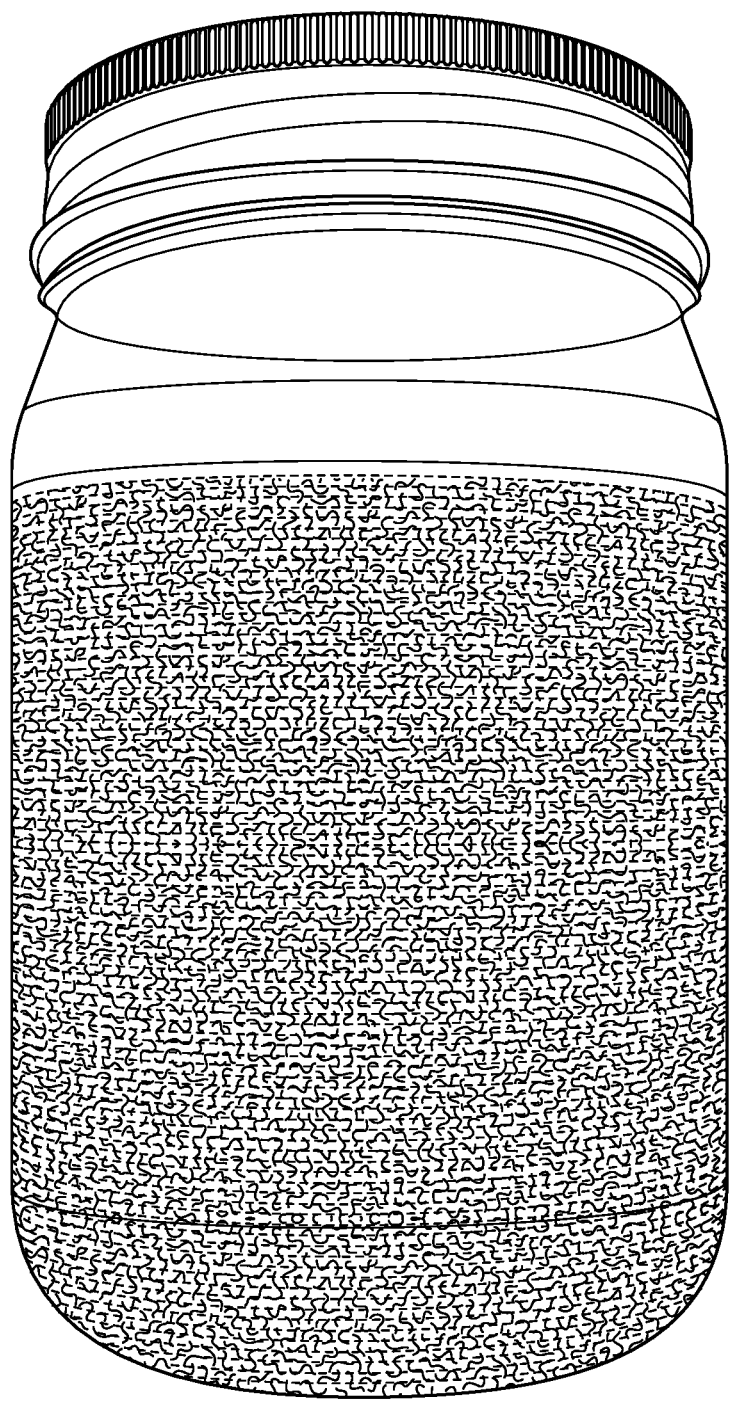
FIG. 2B is a color photograph of a stable emulsion.

FIG. 2A is a color photograph of a partially stable emulsion. Here, the container 100 contains a liquid volume 202 with a stable emulsion portion 204 and a partially stable emulsion portion 206. The mixture shown in FIG. 2A is a drilling fluid embodiment described herein. There is no phase boundary between the portions 204 and 206, but the partially stable emulsion portion 206 is seen to have some small-scale phase separation, but not complete separation. For example, the partially stable emulsion portion 206 is locally separated but the separation does not extend to long distances. FIG. 2B is a color photograph of a stable emulsion. In this case, a drilling fluid emulsion described herein is prepared using the surfactants described herein to form the stable emulsion having no evident dimensional variation in composition.

The amount of the surfactants described herein needed to stabilize an emulsion depends on the composition of the emulsion, both the oil phase and the aqueous phase, and the types of surfactants used. As noted above, longer polyether portions can promote stability when the drilling fluid encounters divalent metal cations, either in the aqueous phase of the drilling fluid itself, or in subterranean waters. Likewise, longer alkyl chains, and alkyl chains having functionalization and/or branching, can promote stability and reduce foaming. For example, in some instances, a surfactant described herein, can stabilize an oil-in-seawater emulsion because the surfactant can have sufficient ether content to passivate the effect of the divalent ions in the seawater to stabilize the emulsion.

As noted above, alkyl ether anions can be carboxylates, sulfonates, and/or phosphonates. Other things being equal, sulfonates can promote more foaming that carboxylates, but as also noted above, foaming can be reduced by tuning structural aspects of the surfactant molecules, for example by increasing the length of the alkyl portion or the number of carbon and hydrogen atoms in the alkyl portion. In general, the drilling fluids described herein keep viscosity of a drilling fluid low to minimize foaming.

The drilling fluids described herein can also prevent unwanted emulsion responses, such as foaming and creaming. Foaming is where air/gas bubbles form in the emulsion, particularly as the emulsion is mixed. Creaming is where oil droplets rise to the top of the emulsion and part of the aqueous phase separates below the emulsion phase.

Additives can be used to adjust other properties of the drilling fluids described herein. Long chain alkyl components, for example, can increase pour point and decrease flash point of the surfactant mixture to an undesirable degree. Such surfactant mixtures can be difficult to work with at a well site. Additives such as aromatic and non-aromatic solvents such as toluene, xylene, Aromatic 150, and Aromatic 200, alcohols, and glycol such as hexyl CARBITOL™ and hexyl CELLOSOLVE™ can increase flash point and lower pour point of the surfactant mixture. While the surfactant anions described herein generally can be selected to minimize foaming, in some cases the surfactant anions described herein can be used with defoaming agents such as DEFOAM X™ available from Schlumberger Ltd. of Houston, TX Other types of defoaming agent chemistry that are compatible with this surfactant include, but are not limited to, silicones, silanes, alcohols, and glycols. Examples include 2-ethylhexanol and propylene glycol. Viscosifying agents known in the art can also be used in the drilling fluids and surfactant packages described herein.

In one example, a surfactant package containing 50 wt % oleth-10 carboxylate, 25 wt % Escaid 110 (a hydrocarbon fluid available from ExxonMobil Chemical Co. of Houston, Texas), and 25 wt % hexyl carbitol resulted in pour point of 33° F. and made a stable oil-in-water emulsion.

The surfactant species described herein can be added or supplemented as esters or ethers that can hydrolyze in the drilling fluid under conditions experienced in a well to yield the surfactant anions described herein. Thus, an alkyl ether carboxylate ester can be added to a drilling fluid mixture to yield a stable emulsion when downhole conditions promote hydrolysis of the ester to the surfactant anion form. In some cases, a drilling fluid may contain an acid of the surfactant anions described herein, an activating base to deprotonate the anions, and an ester or ether of the anion that can hydrolyze at downhole conditions. Such mixtures may be useful in situations where some surfactant anions can be lost due to interaction with formation surfaces and materials, or salted out of the mixture under certain circumstances. Including species that can hydrolyze to yield more surfactant anions in the aqueous continuous phase can supplement any anions lost in this way, thus providing free surfactant molecules to migrate to the oil-water interface to stabilize the emulsion despite surfactant molecules adhering or adsorbing onto solid-liquid interfaces within the downhole formation.

The drilling fluids described herein can use an aqueous phase that is pure water or any level of salinity, up to saturation. The aqueous phase can include alkali metal halide salts, alkali metal salts with small organic anions, and alkali metal salts with inorganic anions such as sulfate, phosphate, and nitrate. As noted above, a saturated saline aqueous mixture can minimize formation damage when drilling through salt-containing formations, but the salinity of the aqueous mixture used for the drilling fluid emulsion can be adjusted, or pure water can be used in some cases.

The surfactants described herein enable drilling methods using emulsion drilling fluids with favorable fluid properties that remain stable or partially stable in downhole conditions. Generally, a surfactant package as described herein is obtained and added to a mixture of a base oil and an aqueous phase that can be pure water or can contain alkali salts, and up to a low level of alkaline earth salts, to form a drilling fluid mixture. The drilling fluid mixture is then subjected to high-shear agitation to form an emulsion. The resulting drilling fluid emulsion is then used to perform a drilling operation.

The surfactant package is generally selected and/or formulated based on known aspects of the formation into which drilling is to be performed. For example, where divalent salts, and/or waters containing divalent salts, are expected to be encountered during the drilling operation, the drilling fluid emulsion can be formulated using surfactants described herein that are less sensitive to the presence of divalent cations. The surfactant package can also be formulated to include species that can hydrolyze at downhole conditions to provide surfactant species of the types described herein. Such hydrolyzable species can fortify the surfactant package in the event some of the surfactant is lost due to interaction with materials of the formation.

While the foregoing is directed to embodiments of the present invention, other and further embodiments of the present disclosure may be devised without departing from the basic scope thereof, and the scope thereof is determined by the claims that follow.

What is claimed is:

1. A surfactant package consisting of:
a surfactant for stabilizing an oil-in-water emulsion of a drilling fluid, the surfactant consisting of an alkyl ether anion having the general formula

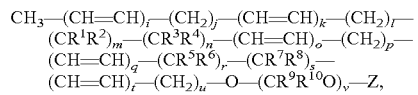

wherein i, j, k, l, m, n, o, p, q, r, s, t, u, and v are integers, i+j+k+l+m+n+o+p+q+r+s+t+u+v is 4 to 30, m+n+r+s is 0 to 2, i+k+o+q+t is 0 to 2, v is 5 to 30, and $R^1$, $R^2$, $R^5$, and $R^6$ are each, independently, in each instance thereof, hydrogen, hydrocarbyl having 1 to 10 carbon atoms, alcohol-containing groups, ether groups, or polyether groups, $R^3$, $R^4$, $R^7$, and $R^8$ are each, independently, in each instance thereof, hydrocarbenyl groups having 1 to 10 carbon atoms and, at most, one carbon-carbon double bond each, $R^9$ and $R^{10}$ are each, independently, in each instance thereof, hydrogen, methyl groups, or ethyl groups, and Z is an anionic head group;
a solvent; and
a defoamer.

2. The surfactant package of claim 1, wherein j=19, i=k=l=m=n=o=p=q=r=s=t=u=0, and Z is carboxylate.

3. The surfactant package of claim 1, wherein i=0; j=7; k=1; l=7; m=n=o=p=q=r=s=t=u=0; v=9, 10, or 11; $R^9=R^{10}$=H; and Z is carboxylate.

4. The surfactant package of claim 1, wherein the alkyl ether anion is oleth-α carboxylate, phosphate, or sulfonate; laureth-α carboxylate, phosphate, or sulfonate; capryleth-α carboxylate, phosphate, or sulfonate; steareth-α carboxylate, phosphate, or sulfonate; palmiteth-α carboxylate, phosphate, or sulfonate, where α is, independently, in each case, 2 to 30; or a combination thereof.

5. The surfactant package of claim 1, wherein the alkyl ether anion is an oleyl ether-9 carboxylate, an oleth-9 carboxylate, an oleth-10 carboxylate, an oleth-11 carboxylate, or a combination thereof.

6. The surfactant package of claim 1, wherein the alkyl ether anion is an oleth-10 carboxylate and is present in the surfactant package at a weight percent of 50 weight percent.

7. The surfactant package of claim 1, wherein the defoamer comprises 2-ehtylhexanol.

8. The surfactant package of claim 1, wherein the defoamer comprises a silane.

9. The surfactant package of claim 1, wherein the defoaming agent defoamer comprises propylene glycol.

* * * * *